United States Patent
Mogi et al.

(10) Patent No.: US 6,756,425 B2
(45) Date of Patent: Jun. 29, 2004

(54) ROOM TEMPERATURE CURABLE SILICONE RUBBER COMPOSITION

(75) Inventors: Hiroshi Mogi, Annaka (JP); Yoshifumi Inoue, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/291,692

(22) Filed: Nov. 12, 2002

(65) Prior Publication Data

US 2003/0109602 A1 Jun. 12, 2003

(30) Foreign Application Priority Data

Nov. 14, 2001 (JP) ........................................ 2001-348816

(51) Int. Cl.$^7$ ............................. C08K 9/06; C08K 3/36; C08L 83/06
(52) U.S. Cl. ...................... 523/212; 523/213; 523/215; 524/492; 524/493; 524/588
(58) Field of Search ................................. 524/492, 493, 524/588; 523/212, 213, 215

(56) References Cited

U.S. PATENT DOCUMENTS

| | | | |
|---|---|---|---|
| 4,562,238 A | * 12/1985 | Kondo et al. | ............ 528/18 |
| 4,719,243 A | 1/1988 | Pocknell | |
| 5,039,736 A | * 8/1991 | Fujiki | ............ 524/730 |
| 5,652,376 A | * 7/1997 | Deleeuw et al. | ............ 73/54.35 |
| 5,688,840 A | * 11/1997 | Ono | ............ 523/209 |
| 5,959,005 A | * 9/1999 | Hartmann et al. | ............ 523/213 |
| 6,090,439 A | * 7/2000 | Menon et al. | ............ 427/215 |
| 6,174,926 B1 | * 1/2001 | Menon et al. | ............ 516/100 |
| 6,471,820 B1 | * 10/2002 | Paulick | ............ 156/306.9 |
| 2003/0130379 A1 | * 7/2003 | Panz et al. | ............ 523/212 |

FOREIGN PATENT DOCUMENTS

EP 0 649 879 4/1995

OTHER PUBLICATIONS

Wacker–Chemie Gmbh, 3 pages, XP–002243692, "Produkte Und Anwendungen", Oct. 1986.
Patent Abstracts of Japan, JP 10–279806, Oct. 20, 1998.

* cited by examiner

Primary Examiner—Jeffrey B. Robertson
(74) Attorney, Agent, or Firm—Oblon, Spivak, McClelland, Maier & Neustadt, P.C.

(57) ABSTRACT

A condensation curable silicone rubber composition is provided which is able to suppress increases in viscosity over time, has an adequate pot life and excellent mold releasability, and displays favorable urethane molding durability. The composition includes: (A) an organopolysiloxane represented by a general formula (I),

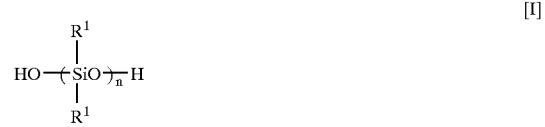

wherein, each $R^1$ represents, independently, a substituted or unsubstituted monovalent hydrocarbon group, and n represents a number which results in a viscosity at 25° C. of 100 to 500,000 mm$^2$/s, with a viscosity at 25° C. of 100 to 500,000 mm$^2$/s; (B) a surface-treated reinforcing fine silica powder with a specific surface area as measured by a BET method of at least 50 m$^2$/g, and a tap density of 0.2 to 0.4 g/ml, which has undergone treatment with an organosilicon compound to produce a quantity of surface carbon of at least 2.5% by weight; and (C) a tin compound-based curing catalyst.

16 Claims, No Drawings

ROOM TEMPERATURE CURABLE SILICONE RUBBER COMPOSITION

BACKGROUND OF THE INVENTION

1. Field of the Invention

The present invention relates to a room temperature curable silicone rubber composition, and specifically to a condensation type room temperature curable silicone rubber composition, and a mold material formed from such a composition.

2. Description of the Prior Art

Condensation curable room temperature curable compositions cure at room temperature to form an elastomeric cured product, and are widely used in a variety of applications including insulating materials, sealing materials, potting materials, molding matrix materials, and tampo printing materials.

In particular, two part type condensation curable compositions are used for molding matrix materials and the like, although in order to enable such compositions to be used in practical applications, they must be provided with an appropriate usable lifetime (or pot life). If the composition does not have a suitable pot life, then curing begins before the composition can be formed into the desired shape, or before the composition can be used to fill a suitable mold, making the practical application of the composition essentially impossible.

However, in conventionally used two part type condensation curable compositions, in which a mixture of an organopolysiloxane and a reinforcing fine silica powder is used as the principal constituent, the pot life is generally short, meaning the curing reaction begins to progress and the viscosity increases during working of the composition, and as a result, these compositions can be difficult to use in practical applications. Furthermore, in those cases where such compositions are used as mold materials, the resulting mold durability relative to urethane resins has been unsatisfactory.

Moreover, Japanese Laid-open publication (kokai) No. 7-41562 (JP7-41562A) discloses a method of producing a liquid silicone rubber composition using a high bulk density silica, although no mention is made of a room temperature (condensation) curable composition. Furthermore, Japanese Laid-open publication (kokai) No. 11-256040 (JP11-256040A) discloses a method of producing a mixture (a base compound) of a silicic acid with a high tap density and a silicone polymer, although no specific description is given of the composition.

SUMMARY OF THE INVENTION

The present invention aims to resolve the problems described above, with an object of providing a room temperature curable silicone rubber composition for which any increase in viscosity over time is suppressed, and which has a pot life that enables adequate workability, and an improved mold durability relative to urethane resins.

The present invention achieves the aforementioned object, with a first aspect that provides a room temperature curable silicone rubber composition comprising:

(A) 100 parts by weight of an organopolysiloxane represented by a general formula (I) shown below, with a viscosity at 25° C. of 100 to 500,000 mm²/s,

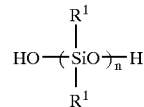

[I]

wherein, each $R^1$ represents, independently, a substituted or unsubstituted monovalent hydrocarbon group, and n represents a number which results in a viscosity at 25° C. of 100 to 500,000 mm²/s, (B) 1 to 100 parts by weight of a surface-treated reinforcing fine silica powder with a specific surface area as measured by a BET method of at least 50 m²/g, and a tap density of 0.2 to 0.4 g/ml, which has undergone treatment with an organosilicon compound to produce a quantity of surface carbon of at least 2.5% by weight, and (C) 0.01 to 10 parts by weight of a tin compound-based curing catalyst.

Furthermore a second aspect of the present invention provides a mold material produced from a composition as described above.

DETAILED DESCRIPTION OF THE PREFERRED EMBODIMENTS

As follows is a more detailed description of the present invention.

[Constituent (A)]

In a room temperature curable composition of the present invention, an organopolysiloxane used as the base polymer of the constituent (A) is represented by a general formula (I) shown below. Either a single material, or a mixture of two or more different materials represented by the general formula (I) may be used.

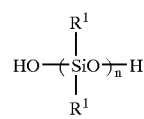

[I]

wherein, each $R^1$ represents, independently, a substituted or unsubstituted monovalent hydrocarbon group, and n represents a number which results in a viscosity at 25° C. of 100 to 500,000 mm²/s.

Specific examples of the group $R^1$ include substituted or unsubstituted monovalent hydrocarbon groups of 1 to 10 carbon atoms, and preferably 1 to 8 carbon atoms, including lower alkyl groups of no more than 8 carbon atoms such as methyl groups, ethyl groups, propyl groups and butyl groups; alkenyl groups such as vinyl groups, allyl groups, isopropenyl groups, butenyl groups and hexenyl groups; acryloyl group, methacryloyl group, acryloyloxy group, and methacryloyloxy group; cycloalkyl groups such as cyclohexyl groups; aryl groups such as phenyl groups, tolyl groups and naphthyl groups; aralkyl groups such as benzyl groups and 2-phenylethyl groups; and groups in which either a portion of, or all of the hydrogen atoms of the aforementioned groups have been substituted with halogen atoms or the like such as chloromethyl groups and 3,3,3-trifluoropropyl groups. These monovalent hydrocarbon groups $R^1$ may also have a portion of the hydrogen atoms substituted with hydroxyl groups, depending on the characteristics required.

Preferred $R^1$ groups are methyl groups, phenyl groups and 3,3,3-trifluoropropyl groups, and methyl groups are particularly desirable.

The number of repeating units n should be a number which produces a viscosity at 25° C. for the organopolysiloxane within a range from 100 to 500,000 mm²/s, and preferably from 500 to 100,000 mm²/s.

An organopolysiloxane represented by the general formula (I) above is typically obtained by equilibration of organocyclopolysiloxanes with an alkali catalyst or an acid catalyst, using water or a silanol group containing low molecular weight compound as a terminator. Examples of possible alkali catalysts for use in this reaction include potassium hydroxide, tetraalkylphosphonium hydroxide and tetraalkylammonium hydroxide, whereas examples of possible acid catalysts include sulfuric acid, methanesulfonic acid and trifluoromethanesulfonic acid.

In the present invention, specific examples of preferred organopolysiloxanes include those represented by the general formulas shown below, although the present invention is not restricted to the formulas shown. In the formulas below, Ph represents a phenyl group.

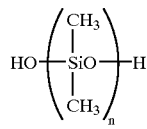

wherein n represents a number which results in a viscosity at 25° C. of 100 to 500,000 mm²/s.

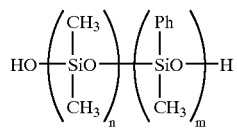

wherein the sum of m and n represents a number which results in a viscosity at 25° C. of 100 to 500,000 mm²/s.

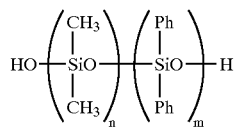

wherein the sum of m and n represents a number which results in a viscosity at 25° C. of 100 to 500,000 mm²/s.

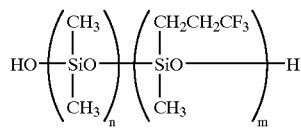

wherein the sum of m and n represents a number which results in a viscosity at 25° C. of 100 to 500,000 mm²/s

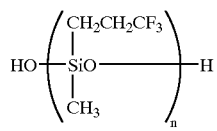

wherein n represents a number which results in a viscosity at 25° C. of 100 to 500,000 mm²/s.

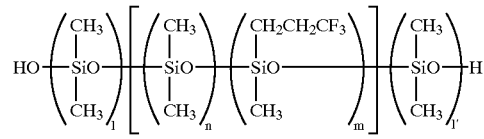

wherein the sum of 1,1', m and n represents a number which results in a viscosity at 25° C. of 100 to 500,000 mm²/s.

[Constituent (B)]

Since the reinforcing fine silica powder of the constituent (B) has been treated on the surface thereof with a specific quantity of an organosilicon compound, increases in viscosity with lapse of time resulting from coagulation of the silicone compound produced by mixing the silica powder with the aforementioned constituent (A) can be suppressed. A pot life which provides adequate workability following mixing with a curing catalyst and a cross-linking agent (an alkoxysilane) can also be ensured. Therefore, this constituent (B) is an extremely important constituent in a room temperature curable silicone rubber composition according to the present invention.

There are no particular restrictions on the type of silica used as the fine silica powder for surface treatment, and any silica used in conventional silicone rubber compositions can be used, although the specific surface area as measured by a BET adsorption method following treatment must be at least 50 m²/g, and the tap density of the silica must be within a range from 0.2 to 0.4 g/ml. Precipitated silica, fumed silica or calcined silica for which the specific surface area as measured by a BET adsorption method is typically from 50 to 600 m²/g, and preferably from 100 to 400 m²/g, and the tap density is preferably from 0.2 to 0.3 g/ml, and even more preferably from 0.22 to 0.30 g/ml, and most preferably from 0.25 to 0.29 g/ml, can be favorably used, and fumed silica is particularly desirable from the viewpoint of improving the rubber strength.

The tap density is measured by compressing a sample packed uniformly inside a cylinder using tapping, and then measuring the closest packing density (the tap density). An example of a suitable measuring device is a KYT-4000 manufactured by Seishin Enterprise Co., Ltd.

The fine silica powder described above is surface-treated using an organosilicon compound and then used as a reinforcing fine silica powder of the present invention. The fine silica powder functions as an essential rubber reinforcing agent, but because untreated silica has a plurality of silanol groups (Si—OH groups) at the surface, if added as a reinforcing agent, the untreated silica is likely to result in an increase in viscosity and a shortening of the pot life due to thixotropic effects and the like. As a result, a feature of the present invention is a hydrophobic treatment of the surface of the silica. The quantity of treatment required is the equivalent of a carbon quantity on the silica surface of at least 2.5% by weight, and preferably at least 3% by weight. At quantities less than 2.5% by weight, the suppression effect on increases in viscosity of the composition and variations in the pot life is limited. There are no particular restrictions on the upper limit for the quantity of carbon, although typically the quantity is no more than 20% by weight, and preferably no more than 12% by weight, and even more preferably no more than 8% by weight.

The carbon quantity on the surface of the silica can be measured by, for example, using NMR to measure the quantity of carbon produced by converting the —OH groups of silanol groups on the silica surface to —O—Si(CH₃)₃ groups through treatment with silazane or the like.

These fine silica powders may be treated directly in powder form, and the surface treatment method can employ readily known techniques. For example, the aforementioned untreated fine silica powder and a surface treatment agent can be placed in a sealed mechanical kneading device at normal pressure, or in a fluidized bed, and then treatment performed by mixing at either room temperature or with heating, where necessary under an atmosphere of an inert gas. In some situations, a catalyst may be used to accelerate the treatment process. By drying the mixture following the mixing treatment, a surface-treated product is obtained.

The surface treatment agent for the fine silica powder utilizes a monomeric organosilicon compound with a hydrolyzable group or a partial hydrolysis-condensation product thereof, and materials capable of covering the surface of the fine silica powder with monomethylsilyl groups, dimethylsilyl groups or trimethylsilyl groups are preferred (in each of these silyl groups, the bonding from the silicon atom, other than the bonds to the methyl group(s), is to an oxygen atom, forming a siloxane construction represented by Si—O—Si). Specific example of suitable surface treatment agents include organosilazanes including hexaorganodisilazanes such as 1,3-divinyltetramethyldisilazane, 1,3-dimethyltetravinyldisilazane and hexamethyldisilazane, and octaorganotrisilazanes such as octamethyltrisilazane and 1,5-divinylhexamethyltrisilazane; silane coupling agents including alkyltrialkoxysilanes such as methyltrimethoxysilane, ethyltrimethoxysilane, propyltrimethoxysilane and butyltrimethoxysilane; dialkyldialkoxysilanes such as dimethyldimethoxysilane, diethyldimethoxysilane, dimethyldiethoxysilane and diethyldiethoxysilane; alkenyltrialkoxysilanes such as vinyltriethoxysilane, vinyltrimethoxysilane and vinyltris(methoxyethoxy)silane; dialkenyldialkoxysilanes such as divinyldimethoxysilane and divinyldiethoxysilane; trialkylalkoxysilanes such as trimethylmethoxysilane and triethylmethoxysilane; trialkenylalkoxysilanes such as trivinylmethoxysilane and trivinylethoxysilane; organochlorosilanes such as trirmethylchlorosilane, dimethyldichlorosilane, methyltrichlorosilane, vinyltrichlorosilane, divinyldichlorosilane, trivinylchlorosilane and chloropropyltrimethoxysilane; and other organosilicon compounds such as dimethylpolysiloxanes and organohydrogenpolysiloxanes; as well as partial hydrolysis-condensation products of these materials. It is also possible to use the compounds exemplified as the constituent (E) below.

Of these, organosilazanes and silane-based coupling agents in which the substituents bonded to silicon atoms, other than the hydrolyzable groups, are methyl groups are preferred, and organosilazanes are particularly preferred.

The quantity of the constituent (B) used should preferably be within a range from 1 to 100 parts by weight per 100 parts by weight of the constituent (A), with quantities from 5 to 50 parts by weight being even more preferred, and quantities from 10 to 40 parts by weight being the most desirable. If the quantity of the constituent (B) is insufficient, then the mechanical strength deteriorates, whereas if the quantity is too large, packing of the constituent (B) becomes difficult, and the handling and workability deteriorate.

Furthermore, during the mixing of the constituent (A) and the constituent (B), an improved effect can be achieved if the aforementioned hydrophobically treated fine silica powder is subjected to additional hydrophobic treatment. Consequently, a surface treatment agent (E) which imparts the desired hydrophobic property may be added at the time of mixing of the constituent (A) and the constituent (B).

Examples of this surface treatment agent (E) used during the aforementioned mixing process include organosilicon compounds such as silane-based coupling agents and the partial hydrolysis-condensation products thereof, organosilazanes, titanate-based coupling agents, organopolysiloxane oils (particularly, dimethylpolysiloxane oil), and organohydrogenpolysiloxane oils. Any compounds described above in respect of the constituent (B) for use in treating silica fine powder in advance can be compounded as the constituent (E).

Specific examples of the aforementioned silane-based coupling agents include methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, trimethylaminosilane, glycidoxypropyltrimethoxysilane, glycidoxypropylmethyldiethoxysilane, (epoxycyclohexyl)ethyltrimethoxysilane, methacryloxypropyltrimethoxysilane, methacryloxypropyltriethoxysilane, divinyldimethoxysilane and chloropropyltrimethoxysilane, although there are no particular restrictions and almost any silane-based compound can be used. In addition, partial hydrolysis-condensation products of the above silanes may also be used. Examples of organosilazanes include hexamethyldisilazane, divinyltetramethyldisilazane and diphenyltetramethyldisilazane. Of these, organosilazanes are preferred. The amount of this surface treatment agent (E) added is typically within a range from 0.1 to 20 parts by weight, and preferably from 1 to 10 parts by weight per 100 parts by weight of the constituent (A).

In addition, in order to accelerate the treatment effect of the surface treatment agent it is preferable that water (F) is also added. The amount of water should be within a range from 0.1 to 10 parts by weight, and preferably from 0.5 to 5 parts by weight per 100 parts by weight of the constituent (A).

[Constituent (C)]

Examples of the catalyst of the constituent (C) include metal salts of carboxylic acids such as tin octoate, tin caprylate and tin oleate; and organotin compounds such as dimethyltin diversatate, dibutyltin diversatate, dibutyltin diacetate, dibutyltin dioctoate, dibutyltin dilaurate, dibutyltin dioleate, diphenyltin diacetate, dibutyltin oxide, dibutyltin dimethoxide, dibutylbis(triethoxy)tin and dioctyltin dilaurate. A tin compound incorporating 1 to 50% by weight of metallic tin may be used as the curing catalyst.

The amount of the constituent (C) used is typically within a range from 0.01 to 10 parts by weight, and preferably from 0.1 to 5 parts by weight, and even more preferably from 0.2 to 4 parts by weight per 100 parts by weight of the silanol group containing organopolysiloxane of the constituent (A). If the quantity of the constituent (C) is insufficient, then the curability of the composition is unsatisfactory and the mold releasability also deteriorates, leading to a deterioration in the mold durability relative to urethane resins. In contrast, if the quantity of the constituent (C) is too large, then cracking may occur in the cured products of the composition, the storage stability of the cured products deteriorate, and there is a tendency for other characteristics of the cured products such as the heat resistance to also deteriorate.

[Constituent (D)]

If desired, a room temperature curable silicone rubber composition of the present invention may incorporate a cross-linking agent (D) in addition to the curing catalyst of the constituent (C), in order to further improve the cross-linking density of the cured product.

Examples of this cross-linking agent include compounds represented by the formula shown below, as well as partial hydrolysis-condensation products thereof.

wherein, $R^2$ represents a substituted or unsubstituted monovalent hydrocarbon group, X represents a hydrolyzable group, and a represents either 0 or 1.

Specific examples of the group $R^2$ include the same groups listed for the aforementioned group $R^1$, although methyl groups, ethyl groups, propyl groups, butyl groups and phenyl groups are preferred. Examples of the hydrolyzable group X include alkoxy groups such as methoxy groups, ethoxy groups, propoxy groups and butoxy groups, ketoxime groups such as methylethylketoxime groups, alkenyloxy groups such as isopropenoxy groups, acyloxy groups such as acetoxy groups, and aminoxy groups such as dimethylaminoxy groups, although alkoxy groups are preferred.

Specific examples of the constituent (D) include trifunctional alkoxysilanes such as methyltrimethoxysilane, methyltriethoxysilane, ethyltrimethoxysilane, ethyltriethoxysilane, butyltrimethoxysilane, butyltriethoxysilane, vinyltrimethoxysilane, phenyltrimethoxysilane and methyltris(methoxyethoxy)silane; tetrafunctional alkoxysilanes such as tetramethoxysilane, tetraethoxysilane and tetrapropoxysilane; as well as methyltripropenoxysilane, methyltriacetoxysilane, vinyltriacetoxysilane, methyltri(butanoxime)silane, vinyltri(butanoxime)silane, phenyltri(butanoxime)silane, propyltri(butanoxime)silane, tetra(butanoxime)silane, 3,3,3-trifluoropropyltri(butanoxime)silane, 3-chloropropyltri(butanoxime)silane, methyltri(propanoxime)silane, methyltri(pentanoxime)silane, methyltri(isopentanoxime)silane, vinyltri(cyclopentanoxime)silane, methyltri(cyclohexanoxime)silane, and partial hydrolysis-condensation products of the above compounds, although of these, alkoxysilanes are preferred.

[Other Constituents]

In addition to the constituents (A) to (C) described above, a variety of other additives may also be incorporated within a composition of the present invention for the purpose of improving certain characteristics of the composition, provided such addition does not impair the effects of the present invention. For example, diluents such as viscosity regulating agents, including dimethylpolysiloxane in which both terminals are blocked with trimethylsilyl groups may be added. Fumed silica different from the constituent (B) above, precipitated silica, or hydrophobic treated materials thereof, or carbon black may be included as reinforcing fillers and sedimentation prevention agents, or as a method of imparting electrical conductivity to the composition. Furthermore, fillers, extenders and thermal conductivity fillers such as quartz powder, fused quartz, spherical silica, diatomaceous earth, zeolite, calcium carbonate, titanium dioxide, iron oxide, alumina, spherical alumina, aluminum hydroxide, aluminum nitride and magnesium sulfate may also be added. In addition, lead compounds such as carbonate salts and hydroxide salts may be incorporated for the purposes of radiation shielding, and other possible additives include coloring agents such as inorganic pigments or organic dyes, and reagents for improving the heat resistance or fire resistance of the composition such as cerium oxide, zinc carbonate, manganese carbonate, benzotriazole and platinum compounds. Furthermore, in order to promote curing and ensure favorable curing to deep sections of the composition, water or alcohols such as methanol, ethanol, propanol or methyl cellosolve may also be added if required.

A composition of the present invention may be formed by mixing the constituents (A) to (C) using a conventional mixing device, although it is preferable that the constituent (A) and the constituent (B) are first mixed together, before the constituent (C) is added and mixed. In those cases in which the aforementioned constituents (E) and/or (F) are used, these constituents should preferably be added during the mixing of the constituent (A) and the constituent (B), whereas in those cases in which the aforementioned constituent (D) is used, this constituent should preferably be added after the constituent (A) and the constituent (B) have been mixed.

EXAMPLES

As follows is a description of specifics of the present invention using a series of examples and comparative examples. However, the present invention is in no way limited to the examples presented. In the examples below, the unit parts refers to parts by weight, and viscosity values refer to measurements conducted at 25° C.

<Preparation of Surface-treated Reinforcing Silica>

Preparation Example 1-1

Untreated fumed silica and hexamethyldisilazane were placed in a fluidized bed, and surface treatment was performed at room temperature under a stream of nitrogen gas. Subsequent heat treatment was then conducted to remove any unreacted material, and yielded a surface-treated fumed silica (1) with a specific surface area as measured by a BET method of 180 m²/g, a tap density of 0.27 g/ml, and a carbon quantity on the hexamethyldisilazane treated surface of 2.8% by weight.

Preparation Example 1-2 (for Comparison)

Using the same method as the preparation example 1-1, a surface-treated fumed silica (2) was prepared with a specific surface area as measured by a BET method of 45 m²/g, a tap density of 0.27 g/ml, and a carbon quantity on the hexamethyldisilazane treated surface of 2.8% by weight.

Preparation Example 1-3 (for Comparison)

Using the same method as the preparation example 1-1, a surface-treated fumed silica (3) was prepared with a specific surface area as measured by a BET method of 180 m²/g, a tap density of 0.45 g/ml, and a carbon quantity on the hexamethyldisilazane treated surface of 2.8% by weight.

Preparation Example 1-4 (for Comparison)

Using the same method as the preparation example 1-1, a surface-treated fumed silica (4) was prepared with a specific surface area as measured by a BET method of 180 m²/g, a tap density of 0.27 g/ml, and a carbon quantity on the hexamethyldisilazane treated surface of 2.0% by weight.

<Preparation of Silicone Compounds>

Preparation Example 2-1

100 parts of a dimethylpolysiloxane with both terminals blocked with silanol groups (viscosity: 5,000 mm²/s), 40 parts of the fumed silica (1) produced in the aforementioned preparation example 1-1, 5 parts of hexamethyldisilazane, and 2.5 parts of water were mixed together inside a kneader for one hour, and the mixture was then heated for 4 hours at 160° C. to yield a silicone compound (1).

Preparation Example 2-2 (for Comparison)

With the exception of replacing the fumed silica (1) with the fumed silica (2), a silicone compound (2) was prepared in the same manner as the preparation example 2-1.

Preparation Example 2-3 (for Comparison)

With the exception of replacing the fumed silica (1) with the fumed silica (3), a silicone compound (3) was prepared in the same manner as the preparation example 2-1.

Preparation Example 2-4 (for Comparison)

With the exception of replacing the fumed silica (1) with the fumed silica (4), a silicone compound (4) was prepared in the same manner as the preparation example 2-1.

<Preparation of Curing Agents>

Preparation Example 3-1

1.0 parts of dioctyltin dilaurate as a curing catalyst, 2.2 parts of phenyltrimethoxysilane as a cross-linking agent, and 1.8 parts of dimethylpolysiloxane with both terminals blocked with trimethylsilyl groups were mixed together to yield a curing agent (1).

Preparation Example 3-2

With the exception of using dioctyltin diversatate instead of dioctyltin dilaurate as the curing catalyst, a curing agent (2) was prepared in the same manner as the preparation example 3-1.

Preparation Example 3-3 (for comparison)

0.005 parts of dioctyltin dilaurate as a curing catalyst, 2.2 parts of phenyltrimethoxysilane as a cross-linking agent, and 2.795 parts of dimethylpolysiloxane with both terminals blocked with trimethylsilyl groups were mixed together to yield a curing agent (3), Preparation Example 3-4 (for comparison)

10.5 parts of dioctyltin diphenylphenoxide as a curing catalyst, and 0.45 parts of phenyltrimethoxysilane as a cross-linking agent were mixed together to yield a curing agent (4).

Examples/Comparative Examples

Example 1

A sample of the aforementioned silicone compound (1) was held at room temperature, and the viscosity variation was measured.

Moreover, another room temperature sample of the silicone compound (1) was mixed with the curing agent (1) in a ratio of 100:5 (weight ratio), yielding a silicone rubber composition. The pot life of this silicone rubber composition was measured.

In addition, a silicone rubber mold was produced from a cured product of the above silicone rubber composition, and the molding durability was measured as a number of urethane resin molding repetitions (the process of injecting, curing and removing a urethane resin was repeated and the number of repetitions counted until the silicone rubber mold (the molding matrix) and the polyurethane molded product adhered sufficiently to cause damage to the silicone rubber mold and prevent further use).

Example 2

With the exception of replacing the curing agent (1) with the curing agent (2), preparation and subsequent measurements were performed in the same manner as the example 1.

Comparative Example 1

With the exception of replacing the silicone compound (1) with the silicone compound (2), preparation and subsequent measurements were performed in the same manner as the example 1.

Comparative Example 2

With the exception of replacing the silicone compound (1) with the silicone compound (3), preparation and subsequent measurements were performed in the same manner as the example 1.

Comparative Example 3

With the exception of replacing the silicone compound (1) with the silicone compound (4), preparation and subsequent measurements were performed in the same manner as the example 1.

Comparative Example 4

With the exception of replacing the curing agent (1) with the curing agent (3), preparation and subsequent measurements were performed in the same manner as the example 1.

Comparative Example 5

With the exception of replacing the curing agent (1) with the curing agent (4), preparation and subsequent measurements were performed in the same manner as the example 1.

The results of the measurements from each of the examples and comparative examples are shown in Table 1.

TABLE 1

| Storage period | | Example 1 | Example 2 | Comparative Example 1 | Comparative Example 2 | Comparative Example 3 | Comparative Example 4 | Comparative Example 5 |
|---|---|---|---|---|---|---|---|---|
| Initial values | viscosity (Pa · s) | 40 | 40 | 35 | 40 | 50 | 40 | 40 |
| | pot life | 90 | 90 | 100 | 60 | 50 | 120 | 120 |

TABLE 1-continued

| Storage period | | Example 1 | Example 2 | Comparative Example 1 | Comparative Example 2 | Comparative Example 3 | Comparative Example 4 | Comparative Example 5 |
|---|---|---|---|---|---|---|---|---|
| 1 month | viscosity (Pa·s) | 40 | 40 | 50 | 60 | 75 | 40 | 40 |
|  | pot life (min.) | 90 | 90 | 60 | 50 | 30 | 120 | 120 |
| 3 months | viscosity (Pa·s) | 40 | 40 | 95 | 80 | 120 | 40 | 40 |
|  | pot life (min.) | 90 | 90 | 40 | 30 | 20 | 120 | 120 |
| 6 months | viscosity (Pa·s) | 40 | 40 | 150 | 120 | 160 | 40 | 40 |
|  | pot life (min.) | 90 | 90 | 35 | 20 | 10 | 120 | 120 |
| Presence of cracking | | no | no | no | no | no | no | yes |
| Urethane molding repetitions | | 130 | 130 | 100 | 100 | 90 | 20 | 80 |

The room temperature curable silicone rubber composition of the present invention is able to suppress increases in viscosity over time of the silicone base (principal constituent), displays excellent pot life and mold releasability, and offers a significant improvement in urethane molding durability, and consequently is particularly suited as a molding matrix material for two part type condensation curing molding.

What is claimed is:

1. A room temperature curable silicone rubber composition comprising:
   (A) 100 parts by weight of an organopolysiloxane represented by a general formula (I) shown below, with a viscosity at 25° C. of 100 to 500,000 mm²/s,

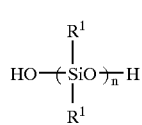

[I]

wherein, each $R^1$ represents, independently, a substituted or unsubstituted monovalent hydrocarbon group, and n represents a number which results in a viscosity at 25° C. of 100 to 500,000 mm²/s,
   (B) 1 to 100 parts by weight of a surface-treated reinforcing fine silica powder with a specific surface area as measured by a BET method of at least 50 m²/g, and a tap density of 0.2 to 0.4 g/ml, which has undergone treatment with an organosilicon compound to produce a quantity of surface carbon of at least 2.5% by weight, and
   (C) 0.01 to 10 parts by weight of a tin compound-based curing catalyst.

2. The composition according to claim 1, wherein $R^1$'s in the general formula are independently lower alkyl groups of no more than 8 carbon atoms, alkenyl groups, acryloyl group, methacryloyl group, acryloyloxy group, methacryloyloxy group, cycloalkyl groups, aryl groups, aralkyl groups, or groups in which either a portion of, or all of the hydrogen atoms of the aforementioned groups have been substituted with halogen atoms.

3. The composition according to claim 1, wherein $R^1$'s in the general formula are independently a methyl group, a phenyl group or a 3,3,3-trifluoropropyl group.

4. The composition according to claim 1, wherein n in the general formula is a number which produces a viscosity at 25° C. for the organopolysiloxane within a range from 500 to 100,000 mm²/s.

5. The composition according to claim 1, wherein the surface-treated fine silica powder of the constituent (B) has a specific surface area as measured by a BET adsorption method of 50 to 600 m²/g, and a tap density of 0.2 to 0.3 gml.

6. The composition according to claim 1, wherein the surface-treated fine silica powder of the constituent (B) has been prepared by surface treatment of a powder of precipitated silica, fumed silica or calcined silica.

7. The composition according to claim 1, wherein the organosilicon compound used for surface treatment is a monomeric organosilicon compound with a hydrolyzable group or a partial hydrolysis-condensation product thereof.

8. The composition according to claim 1, wherein the organosilicon compound used for surface treatment is a hexaorganodisilazane, octaorganotrisilazane, alkyltrialkoxysilane, dialkyldialkoxysilane, alkenyltrialkoxysilane, dialkenyldialkoxysilane, trialkylalkoxysilane, trialkenylalkoxysilane, organochlorosilane, chloropropyltrimethoxysilane, dimethylpolysiloxane, or organohydrogenpolysiloxane.

9. The composition according to claim 1, wherein the quantity of the surface carbon is in the range of 3 to 20% by weight.

10. The composition according to claim 1, further comprising: (D) a cross-linking agent.

11. The composition according to claim 10, wherein said crosslinking agent of the constituent (D) comprises a compound having the following formula:

wherein $R^2$ represents a substituted or unsubstituted monovalent hydrocarbon group, X represents a hydrolyzable group, and a represents either 0 or 1, or a partial hydrolysis-condensation product thereof.

12. The composition according to claim 10, wherein said cross-linking agent (D) is a compound selected from the group consisting of an alkoxysilane with at least two alkoxy groups per molecule, and partial hydrolysis-condensation products thereof.

13. The composition according to claim 1, further comprising: (E) 0.1 to 20 parts by weight of an organosilicon compound used for said surface treatment of said constituent (B).

14. The composition according to claim 1, further comprising: (F) 0.1 to 10 parts by weight of water.

15. The composition according to claim 1, wherein the constituent (B) is present in a quantity of 5 to 50 parts by weight and the constituent (C) is present in a quantity of 0.1 to 5 parts by weight, per 100 parts by weight of the constituent (A).

16. A mold material comprising a composition according to claim 1.

* * * * *